(12) United States Patent
Takeuchi et al.

(10) Patent No.: US 11,914,211 B2
(45) Date of Patent: Feb. 27, 2024

(54) INTEGRATED CONNECTOR CABLE

(71) Applicant: Go!Foton Holdings, Inc., Somerset, NJ (US)

(72) Inventors: Kenichiro Takeuchi, North Brunswick, NJ (US); Haiguang Lu, Los Altos, CA (US); David Zhi Chen, Dallas, TX (US); Kenichiro Nakamura, San Diego, CA (US)

(73) Assignee: Go!Foton Holdings, Inc., Somerset, NJ (US)

(*) Notice: Subject to any disclaimer, the term of this patent is extended or adjusted under 35 U.S.C. 154(b) by 0 days.

(21) Appl. No.: 17/396,211

(22) Filed: Aug. 6, 2021

(65) Prior Publication Data
US 2021/0364709 A1    Nov. 25, 2021

Related U.S. Application Data

(62) Division of application No. 16/551,030, filed on Aug. 26, 2019, now Pat. No. 11,119,284.
(Continued)

(51) Int. Cl.
*G02B 6/44* (2006.01)
*G02B 6/38* (2006.01)

(52) U.S. Cl.
CPC ......... *G02B 6/4478* (2013.01); *G02B 6/3825* (2013.01); *G02B 6/3839* (2013.01); *G02B 6/38875* (2021.05)

(58) Field of Classification Search
None
See application file for complete search history.

(56) References Cited

U.S. PATENT DOCUMENTS

| | | | | |
|---|---|---|---|---|
| 5,085,283 A | * | 2/1992 | Seabourn | F16C 1/06 175/323 |
| 5,444,804 A | * | 8/1995 | Yui | G02B 6/30 385/98 |

(Continued)

FOREIGN PATENT DOCUMENTS

| | | |
|---|---|---|
| CN | 202583508 U | 12/2012 |
| JP | 2003255195 A | 9/2003 |

(Continued)

OTHER PUBLICATIONS

"2×2 Fiber PLC Splitter with Fan-out Kits, Fibermart", [online] [retrieved Feb. 4, 2020]. Retrieved from the Internet: <https://www.fiber-mart.com/2x2-fiber-plc-splitter-with-fanout-kits-p-2965.html> (undated), [Admitted as prior art at least as of May 9, 2019], 6 pages.

(Continued)

*Primary Examiner* — Rhonda S Peace
(74) *Attorney, Agent, or Firm* — Lerner David LLP

(57) ABSTRACT

An optical connector assembly includes an optical component assembly, inner and outer optical fibers, a componentry cover, and a connector. The optical component assembly includes an optical unit. The inner and the outer optical fibers are on opposing sides of the optical unit such that the optical unit receives a first optical signal from the inner optical fiber and the outer optical fiber receives a second optical signal from the optical unit or such that the optical unit receives the second optical signal from the outer optical fiber and the inner optical fiber receives the first optical signal from the optical unit. The componentry cover encapsulates an entirety of the optical unit and portions of the inner and the outer optical fibers. The connector includes a portion of first outer optical fiber that is exposed to route the second optical signal.

20 Claims, 9 Drawing Sheets

Related U.S. Application Data

(60) Provisional application No. 62/725,619, filed on Aug. 31, 2018.

(56) References Cited

U.S. PATENT DOCUMENTS

| | | | |
|---|---|---|---|
| 5,481,632 A | 1/1996 | Hirai et al. | |
| 5,625,730 A | 4/1997 | Ishikawa et al. | |
| 5,696,860 A | 12/1997 | Semura et al. | |
| 5,754,725 A | 5/1998 | Kuder et al. | |
| 5,930,438 A | 7/1999 | Palmskog et al. | |
| 5,999,674 A | 12/1999 | Yui et al. | |
| 6,146,023 A | 11/2000 | Weigel | |
| 6,422,760 B1 | 7/2002 | Matasek et al. | |
| 6,434,315 B1 | 8/2002 | Grois et al. | |
| 6,478,475 B2 | 11/2002 | Schofield et al. | |
| 6,695,486 B1 | 2/2004 | Falkenberg | |
| 6,865,332 B1 | 3/2005 | Saravanos et al. | |
| 6,874,944 B1* | 4/2005 | Hermsen | G02B 6/3897 385/55 |
| 7,121,732 B2 | 10/2006 | Pimpinella et al. | |
| 7,218,828 B2 | 5/2007 | Feustel et al. | |
| 7,636,507 B2 | 12/2009 | Lu et al. | |
| 8,939,792 B2 | 1/2015 | Takeuchi et al. | |
| 9,344,776 B2 | 5/2016 | Takeuchi et al. | |
| 9,360,649 B2* | 6/2016 | Chang | G02B 6/4446 |
| 9,417,418 B2 | 8/2016 | Eberle, Jr. et al. | |
| 9,462,356 B2 | 10/2016 | Takeuchi et al. | |
| 9,513,445 B2 | 12/2016 | Cox et al. | |
| 9,581,781 B2 | 2/2017 | Takeuchi et al. | |
| 9,584,879 B2 | 2/2017 | Takeuchi et al. | |
| 9,728,945 B2 | 8/2017 | Takeuchi et al. | |
| 9,851,523 B2 | 12/2017 | Takeuchi et al. | |
| 10,310,206 B2 | 6/2019 | Takeuchi et al. | |
| 10,451,809 B2 | 10/2019 | Eberle, Jr. et al. | |
| 11,119,284 B2* | 9/2021 | Takeuchi | G02B 6/3839 |
| 2002/0179312 A1* | 12/2002 | Santelli, Jr. | H02G 3/0468 174/34 |
| 2003/0039453 A1* | 2/2003 | Holmquist | G02B 6/38875 385/86 |
| 2003/0161583 A1 | 8/2003 | Kuhara | |
| 2004/0117981 A1 | 6/2004 | Roth et al. | |
| 2006/0165366 A1 | 7/2006 | Feustel et al. | |
| 2006/0245694 A1 | 11/2006 | Chen et al. | |
| 2008/0152291 A1 | 6/2008 | Graff et al. | |
| 2008/0205823 A1 | 8/2008 | Luther et al. | |
| 2009/0022457 A1 | 1/2009 | de Jong et al. | |
| 2013/0064506 A1 | 3/2013 | Eberle, Jr. et al. | |
| 2013/0209041 A1 | 8/2013 | Szilagyi et al. | |
| 2013/0209042 A1 | 8/2013 | Belenkiy et al. | |
| 2015/0117822 A1 | 4/2015 | Hu et al. | |
| 2017/0017053 A1 | 1/2017 | Li et al. | |
| 2019/0121029 A1 | 4/2019 | Faraj et al. | |
| 2020/0073059 A1 | 3/2020 | Takeuchi et al. | |
| 2020/0249412 A1 | 8/2020 | Marcouiller et al. | |

FOREIGN PATENT DOCUMENTS

| | | |
|---|---|---|
| JP | 2003332998 A | 11/2003 |
| JP | 2009163108 A | 7/2009 |
| JP | 2011008209 A | 1/2011 |
| JP | 2015515028 A | 5/2015 |
| WO | 2013112858 A1 | 8/2013 |
| WO | 2013148571 A1 | 10/2013 |
| WO | 2014164332 A1 | 10/2014 |
| WO | 2018152080 A1 | 8/2018 |

OTHER PUBLICATIONS

"Customized 1×N, 2×N Blade Module Fiber Splitter, LC/SC/FC, UPC/APC, Singlemode, #48478", [online] [retrieved Feb. 4, 2020]. Retrieved from the Internet: <https://www.fs.com/products/48478.html> (undated), [Admitted as prior art at least as of May 9, 2019], 6 pages.

"Fibre Optic Splitters, Satellite & Data by Fibre, Time for a change to Fibre, FTTx, Datacomms and WiFi equipment", [online] [retrieved Feb. 4, 2020]. Retrieved from the Internet: <http://www.satellitebyfibre.co.uk/contents/en-uk/d111.html> (undated), [Admitted as prior art at least as of May 9, 2019], 3 pages.

"FMS MPO Passive Optical Splitter Module, Fiber Optic Networking Products Fiberdyne Labs, Inc.", [online] [retrieved Feb. 4, 2020]. Retrieved from the Internet: <http://www.fiberdyne.com/products/mpo-passive-optical-splitter-module.html> (undated), [Admitted as prior art at least as of May 9, 2019], 5 pages.

"Tutorials of Fiber Optic Products, Fiber Optic Communication Products and Tutorials, PLC Splitter Selection Guide", [online] [retrieved Feb. 4, 2020]. Retrieved from the Internet: <http://www.fiber-optic-tutorial.com/category/network-solutions/optical-splitter> (posted in Jul. 2014) 14 pages.

"Tutorials of Fiber Optic Products, Fiber Optic Communication Products and Tutorials, Typical example of photonic packaging", [online] [retrieved Feb. 4, 2020]. Retrieved from the Internet: http://www.fiber-optic-tutorial.com/typical-example-of-photonic-packaging.html#more-498 (posted in Jul. 2014), 3 pages.

GFOTON 3.0F-043, MPO and MTT Connectors, admitted as prior art at least as of Aug. 30, 2017.

International Search Report and Written Opinion for Application No. PCT/US2019/048855 dated Jan. 10, 2020, 27 pages.

* cited by examiner

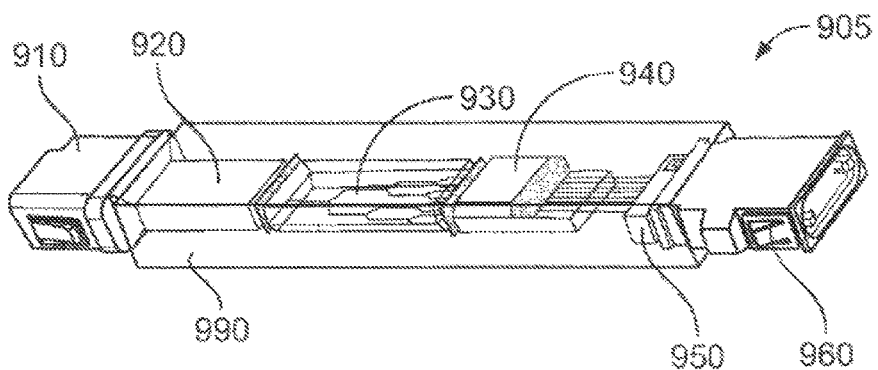
FIG. 10A
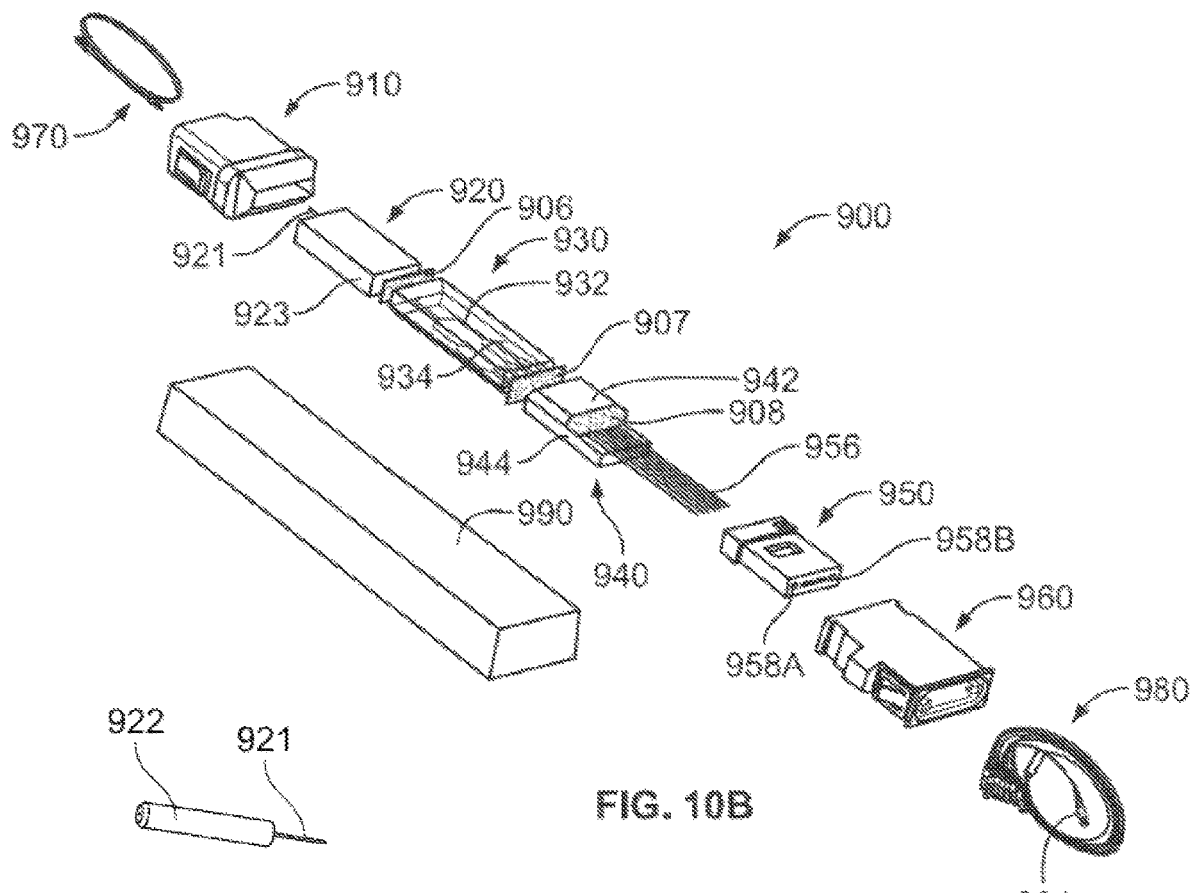
FIG. 10B
FIG. 11

INTEGRATED CONNECTOR CABLE

CROSS-REFERENCE TO RELATED APPLICATIONS

The present application is a divisional application of U.S. patent application Ser. No. 16/551,030, filed Aug. 26, 2019, which claims the benefit of the filing date of U.S. Provisional Patent Application No. 62/725,619, filed Aug. 31, 2018, the disclosures of which are hereby incorporated herein by reference.

FIELD

The present disclosure relates generally to optical cables and assemblies and, in particular, to relieving bending stresses on such devices.

BACKGROUND

In optical systems, optical cables are connected to components such as adapters, patch panels, and other optical cables configured to receive the optical cables. Connectors, boots covering the connectors on the ends of the cables, and the components to which connectors are connected, may be subjected to bending stresses when placed into compact environments, e.g., optical fiber cable termination boxes or units used by telecommunications companies. These stresses often lead to failures of the cable or the components to which the cable is connected prior to their expected useful life. Permanently bent boots have been utilized in response to these stresses. However, straight boot portions are preferred in some applications or within certain space constraints, and moreover, bent cable boots can be difficult for operators to manipulate in certain applications.

Additional stresses are added at the junctions of cables and termination units due to the stiffness and weight of optical components in the cable, e.g., when cables are acted upon in a transverse direction to longitudinal axes defined by the cables, which may interconnect optical fibers or interconnect the fibers with other adapters or termination units that perform special functions, where the optical components may include filters, reflectors, and splitters. Such optical components occupy valuable equipment space and are loosely secured.

Accordingly, there is a need for alternative optical cable configurations to reduce bending stresses in the cables and at the components to which the cables are connected, and as always, to further enhance the capabilities of optical cables.

SUMMARY

In accordance with an aspect, an optical cable may include an optical component assembly, a first inner optical fiber, a first outer optical fiber, a componentry cover, and a connector. The optical component assembly may include an optical unit. The first inner and the first outer optical fibers may be on opposing sides of the optical unit such that the optical unit may receive a first optical signal from the first inner optical fiber and the first outer optical fiber may receive a second optical signal from the optical unit or such that the optical unit may receive the second optical signal from the first outer optical fiber and the first inner optical fiber may receive the first optical signal from the optical unit. The componentry cover may encapsulate an entirety of the optical unit and first portions of the first inner and the first outer optical fibers. The connector may include a second portion of the first outer optical fiber in which the second portion may be exposed to route the second optical signal.

In some arrangements, the first optical signal may be the same as the second optical signal. In some arrangements, the first optical signal may be formed by a light beam. In some such arrangements, the light beam may be modified by the optical unit and the second optical signal may be formed by the modified light beam.

In some arrangements, the optical unit may include any one or any combination of a termination unit, one or more filters or filter modules such as but not limited to an optical tap filter, a splitter device, a coupler device, a reflector, an attenuator, a dispersion compensator, an electro-optical element such as but not limited to a tap photodiode array that may receive both optical signals that may be conveyed by optical fibers and electrical signals that may be conveyed by electrical wires, and other optical componentry.

In some arrangements in which the optical unit includes a termination unit, each of the inner and outer optical fibers may terminate at the termination unit. In some arrangements in which the optical unit includes an electro-optical component, the electro-optical component may be attached to an electrical wire such that the electro-optical component conveys an electrical signal from the electrical and further may convey an optical signal from either the first inner optical fiber or the first outer optical fiber.

In some arrangements, an optical unit including an optical signal splitter or coupler device may enable N×M optical fiber coupling. The optical signal splitter or coupler device may be wavelength or power distribution based. In some arrangements, a wavelength-based splitter or coupler device may be a wavelength-division multiplexer (WDM). In some arrangements, a power distribution-based splitter or coupler device, either of which is not wavelength dependent, may be an optical fiber tap. In some such arrangements, the optical fiber tap may run parallel with the respective first inner optical fiber or first outer optical fiber, as the case may be.

In some arrangements, the connector may further include a ferrule and the second portion of the first outer optical fiber may extend through the ferrule to an end of the ferrule. In some such arrangements, the connector may further include a connector housing surrounding a portion of the ferrule. In some arrangements, the connector may be a simplex connector.

In some arrangements, the cable may further include a jacket and a chamfer or round. The jacket may surround a second portion of the first inner optical fiber. The chamfer or round may have opposing ends attached to the componentry cover and the jacket, respectively. In some such arrangements, an outside diameter of the componentry cover may be larger than an outside diameter of the jacket such that the respective chamfer or round may taper from the componentry cover to the jacket. In some arrangements, the respective chamfer or round may be a boot that overlies the jacket and is adjacent to the respective componentry cover such that the componentry cover is exposed. In this manner, the boot may provide strain relief at the interface of the jacket and the componentry cover. In some arrangements, the boot may be a boot for covering optical fibers in the form known to those skilled in the art.

In some arrangements, the cable may further include an additional inner optical fiber and an additional outer optical fiber. The additional inner and the additional outer optical fibers may be on opposing sides of the optical unit such that the optical unit receives a third optical signal from the additional inner optical fiber and the additional outer optical fiber receives a fourth optical signal from the optical unit or such that the optical unit receives the fourth optical signal from the additional outer optical fiber and the additional inner optical fiber receives the third optical signal from the optical unit. In some such arrangements, the componentry cover may further encapsulate respective first portions of the additional inner and the additional outer optical fibers. In some arrangements, the connector may include a respective second portion of the additional outer optical fiber in which the second portion of the additional outer optical fibers may be exposed to route the fourth optical signal.

In some arrangements including an additional inner optical fiber and an additional outer optical fiber, the connector may further include a ferrule, and the second portions of the first outer optical fiber and the additional outer optical fiber may extend through the ferrule to an end of the ferrule. In some such arrangements, the connector may further include a connector housing surrounding a portion of the ferrule.

In some arrangements including an additional inner optical fiber and an additional outer optical fiber, the connector may further include a connector housing, and the second portions of the first outer optical fiber and the additional outer optical fiber may extend through the connector housing. In some such arrangements, the connector housing may be non-cylindrical. In some such arrangements, the connector housing may be cylindrical.

In some arrangements including an additional inner optical fiber and an additional outer optical fiber, the connector may further include a pair of ferrules in which the connector housing may surround portions of the pair of the ferrules. The second portion of the first outer optical fiber may extend through one of the pair of the ferrules, and the second portion of the additional outer optical fiber may extend through the other one of the pair of the ferrules.

In some arrangements including an additional inner optical fiber and an additional outer optical fiber, the connector may be a duplex connector, e.g., an LC or SC duplex connector.

In some arrangements, the cable may further include a jacket over the first inner optical fiber and a bendable cover attaching the componentry cover to the jacket. The bendable cover may be bendable from a first state to a second state. The second state may be maintained in the absence of an external force being applied to the optical cable. In some arrangements, the external force is a non-gravitational force.

In some arrangements, the cable may further include a bendable cover attaching the componentry cover to the connector. The bendable cover may be bendable from a first state to a second state. The second state may be maintained in the absence of an external force being applied to the optical cable. In some arrangements, the external force is a non-gravitational force. In some such arrangements, the bendable cover may be bendable to at most an angle corresponding to a minimum bending radius for the optical fibers.

In some arrangements including the bendable cover, the second portion of the first outer optical fiber may extend through the bendable cover. In some arrangements including the bendable cover, the bendable cover may be a metal tube. In some arrangements including the bendable cover, the bendable cover and the componentry cover may be integral with each other such that the bendable cover and the componentry cover are inseparable without fracture of at least one of such covers. In some arrangements including the bendable cover, more force may be required to bend the componentry cover than to bend the bendable cover. In some such arrangements, the componentry cover may be substantially rigid. In some arrangements including the bendable cover, the bendable cover may be in the form of bellows.

In some arrangements including the bendable cover, the cable may further include a boot overlying the jacket and the componentry cover in which the boot may be adjacent to the bendable cover to expose the bendable cover. In this manner, the boot may provide additional strain relief in the cable. In some arrangements, the boot may be a boot for covering optical fibers in the form known to those skilled in the art.

In some arrangements, the cable may further include a hinge including a pin attaching the componentry cover to the connector. In some such arrangements, the connector may remain in substantially the same position after being bent until an external force applied to the optical cable bends the hinge thereby moving the connector to a different position. In some arrangements, the external force is a non-gravitational force. In some arrangements, the connector and the componentry cover may be directly attached to the pin of the hinge to form respective parts of the hinge.

In some arrangements, the componentry cover or the connector may include a protrusion and the other of the componentry cover or the connector may include a hole receiving the protrusion to define a hinge attaching the componentry cover to the connector.

In some arrangements, the cable may further include a ball-and-socket joint. The ball-and-socket joint may include a ball attached to the componentry cover or the connector and a socket attached to the other of the componentry cover and the connector. In some such arrangements, the connector may remain in substantially the same state after being bent until an external force applied to the optical cable bends the ball-and-socket joint thereby moving the connector to obtain a different state. In some arrangements, the external force is a non-gravitational force. In some arrangements, the ball may include a ball passageway, and the socket may include a socket passageway. In this manner, the second portion of the first optical fiber may extend through at least one of the ball passageway or the socket passageway.

In some arrangements, the componentry cover may define a notch that may extend to an end of the cover through which the first inner optical fiber extends. In some such arrangements, the notch may be in the form of an inset portion of the componentry cover.

In some arrangements in which the componentry cover defines a notch, the cable may be a first cable. In such arrangements, an additional cable in the form of the first cable may, together with the first cable, may form an optical cable combination. In some such arrangements, the additional cable may be bendable such that a portion of a componentry cover of the additional cable may be able to contact the notch of the first cable when the additional cable and first cable are in respective bent states.

In some arrangements in which the componentry cover defines a notch, the cable may be a first cable. In such arrangements, an additional cable in the form of the first cable may, together with the first cable, may form an optical cable combination. In some such arrangements, the additional cable may be bendable such that a portion of a componentry cover of the additional cable may fit within the notch of the first cable when the additional cable and first cable are in respective bent states.

In accordance with another aspect, an optical cable termination assembly may include an optical cable and a termination unit. The optical cable may include an optical component assembly, a first inner optical fiber, a first outer optical fiber, a componentry cover, and a connector. The optical component assembly may include an optical unit.

The first inner and the first outer optical fibers may be on opposing sides of the optical unit such that the optical unit may receive a first optical signal from the first inner optical fiber and the first outer optical fiber may receive a second optical signal from the optical unit or such that the optical unit may receive the second optical signal from the first outer optical fiber and the first inner optical fiber may receive the first optical signal from the optical unit. The componentry cover may encapsulate an entirety of the optical unit and first portions of the first inner and the first outer optical fibers. The connector may include a second portion of the first outer optical fiber in which the second portion may be exposed to route the second optical signal. The cable may be inserted into the termination unit to at least one of route the second optical signal from the first outer optical fiber to another optical cable inserted in the termination unit or receive the second optical signal at the first outer optical fiber from the other optical cable inserted in the termination unit.

In accordance with another aspect, an optical cable may include an optical component assembly, first inner and first outer optical fibers, a componentry cover, a connector, and a bendable cover. The optical component assembly may include an optical unit. The first inner and the first outer optical fibers may be on opposing sides of the optical unit such that the optical unit may receive a first optical signal from the first inner optical fiber and the first outer optical fiber may receive a second optical signal from the optical unit or such that the optical unit may receive the second optical signal from the first outer optical fiber and the first inner optical fiber may receive the first optical signal from the optical unit. The componentry cover may encapsulate an entirety of the optical unit and portions of the first inner and the first outer optical fibers. The connector may include a second portion of the first outer optical fiber in which the second portion may be exposed to route the second optical signal. The bendable cover may attach the componentry cover to the connector. The bendable cover may be bendable from a first state to a second state, and the second state may be maintained in the absence of an external force being applied to the optical cable. Less force may be required to bend the bendable cover than to bend the componentry cover. The second portion of the first outer optical fiber may extend through the bendable cover. In some arrangements, the external force is a non-gravitational force.

In some arrangements, the first optical signal may be the same as the second optical signal. In some arrangements, the first optical signal may be formed by a light beam. In some such arrangements, the light beam may be modified by the optical unit and the second optical signal may be formed by the modified light beam.

In some arrangements, the optical unit may include any one or any combination of a termination unit, one or more filters or filter modules such as but not limited to an optical tap filter, a splitter device, a coupler device, a reflector, an attenuator, a dispersion compensator, an electro-optical element such as but not limited to a tap photodiode array that may receive both optical signals that may be conveyed by optical fibers and electrical signals that may be conveyed by electrical wires, and other optical componentry.

In some arrangements in which the optical unit includes a termination unit, each of the inner and outer optical fibers may terminate at the termination unit. In some arrangements in which the optical unit includes an electro-optical component, the electro-optical component may be attached to an electrical wire such that the electro-optical component conveys an electrical signal from the electrical and further may convey or transmit an optical signal from either the first inner optical fiber or the first outer optical fiber.

In some arrangements, an optical unit including an optical signal splitter or coupler device may enable N×M optical fiber coupling. The optical signal splitter or coupler device may be wavelength or power distribution based. In some arrangements, a wavelength-based splitter or coupler device may be a WDM. In some arrangements, a power distribution-based splitter or coupler device may be an optical fiber tap. In some such arrangements, the optical fiber tap may run parallel with the respective first inner optical fiber or first outer optical fiber, as the case may be.

In some arrangements, the connector may further include a ferrule and the second portion of the first outer optical fiber may extend through the ferrule to an end of the ferrule. In some such arrangements, the connector may further include a connector housing surrounding a portion of the ferrule. In some arrangements, the connector may be a simplex connector.

In some arrangements, the cable may further include a jacket and a chamfer or round. The jacket may surround a second portion of the first inner optical fiber. The chamfer or round may have opposing ends attached to the componentry cover and the jacket, respectively. In some such arrangements, an outside diameter of the componentry cover may be larger than an outside diameter of the jacket such that the respective chamfer or round may taper from the componentry cover to the jacket. In some arrangements, the respective chamfer or round may be a boot that overlies the jacket and is adjacent to the respective componentry cover such that the componentry cover is exposed. In this manner, the boot may provide strain relief at the interface of the jacket and the componentry cover. In some arrangements, the boot may be a boot for covering optical fibers in the form known to those skilled in the art.

In some arrangements, the cable may further include an additional inner optical fiber and an additional outer optical fiber. The additional inner and the additional outer optical fibers may be on opposing sides of the optical unit such that the optical unit receives a third optical signal from the additional inner optical fiber and the additional outer optical fiber receives a fourth optical signal from the optical unit or such that the optical unit receives the fourth optical signal from the additional outer optical fiber and the additional inner optical fiber receives the third optical signal from the optical unit. In some such arrangements, the componentry cover may further encapsulate respective first portions of the additional inner and the additional outer optical fibers. In some arrangements, the connector may include a respective second portion of the additional outer optical fiber in which the second portion of the additional outer optical fibers may be exposed to route the fourth optical signal.

In some arrangements including an additional inner optical fiber and an additional outer optical fiber, the connector may further include a ferrule, and the second portions of the first outer optical fiber and the additional outer optical fiber may extend through the ferrule to an end of the ferrule. In some such arrangements, the connector may further include a connector housing surrounding a portion of the ferrule.

In some arrangements including an additional inner optical fiber and an additional outer optical fiber, the connector may further include a connector housing, and the second portions of the first outer optical fiber and the additional outer optical fiber may extend through the connector housing. In some such arrangements, the connector housing may be non-cylindrical. In some such arrangements, the connector housing may be cylindrical.

In some arrangements including an additional inner optical fiber and an additional outer optical fiber, the connector may further include a pair of ferrules in which the connector housing may surround portions of the pair of the ferrules. The second portion of the first outer optical fiber may extend through one of the pair of the ferrules, and the second portion of the additional outer optical fiber may extend through the other one of the pair of the ferrules.

In some arrangements including an additional inner optical fiber and an additional outer optical fiber, the connector may be a duplex connector, e.g., an LC or SC duplex connector.

In some such arrangements, the bendable cover may be bendable to at most an angle corresponding to a minimum bending radius for the optical fibers.

In some arrangements, the second portion of the first outer optical fiber may extend through the bendable cover. In some arrangements, the bendable cover may be a metal tube. In some arrangements, the bendable cover and the componentry cover may be integral with each other such that the bendable cover and the componentry cover are inseparable without fracture of at least one of such covers. In some arrangements, more force may be required to bend the componentry cover than to bend the bendable cover. In some such arrangements, the componentry cover may be substantially rigid. In some arrangements, the bendable cover may be in the form of bellows.

In some arrangements including the bendable cover, the cable may further include a boot overlying the jacket and the componentry cover in which the boot may be adjacent to the bendable cover to expose the bendable cover. In this manner, the boot may provide additional strain relief in the cable. In some arrangements, the boot may be a boot for covering optical fibers in the form known to those skilled in the art.

In some arrangements, the componentry cover may define a notch that may extend to an end of the cover through which the first inner optical fiber extends. In some such arrangements, the notch may be in the form of an inset portion of the componentry cover.

In some arrangements in which the componentry cover defines a notch, the cable may be a first cable. In such arrangements, an additional cable in the form of the first cable may, together with the first cable, may form an optical cable combination. In some such arrangements, the additional cable may be bendable such that a portion of a componentry cover of the additional cable may be able to contact the notch of the first cable when the additional cable and first cable are in respective bent states.

In some arrangements in which the componentry cover defines a notch, the cable may be a first cable. In such arrangements, an additional cable in the form of the first cable may, together with the first cable, may form an optical cable combination. In some such arrangements, the additional cable may be bendable such that a portion of a componentry cover of the additional cable may fit within the notch of the first cable when the additional cable and first cable are in respective bent states.

In accordance with another aspect, an optical cable termination assembly may include an optical cable and a termination unit. The optical cable may include an optical component assembly, first inner and first outer optical fibers, a componentry cover, a connector, and a bendable cover. The optical component assembly may include an optical unit. The first inner and the first outer optical fibers may be on opposing sides of the optical unit such that the optical unit may receive a first optical signal from the first inner optical fiber and the first outer optical fiber may receive a second optical signal from the optical unit or such that the optical unit may receive the second optical signal from the first outer optical fiber and the first inner optical fiber may receive the first optical signal from the optical unit. The componentry cover may encapsulate an entirety of the optical unit and portions of the first inner and the first outer optical fibers. The connector may include a second portion of the first outer optical fiber in which the second portion may be exposed to route the second optical signal. The bendable cover may attach the componentry cover to the connector. The bendable cover may be bendable from a first state to a second state, and the second state may be maintained in the absence of an external force being applied to the optical cable. Less force may be required to bend the bendable cover than to bend the componentry cover. The second portion of the first outer optical fiber may extend through the bendable cover. In some arrangements, the external force is a non-gravitational force. The cable may be inserted into the termination unit to at least one of route the second optical signal from the first outer optical fiber to another optical cable inserted in the termination unit or receive the second optical signal at the first outer optical fiber from the other optical cable inserted in the termination unit.

In accordance with another aspect, a fiber optic connector may include a single fiber adapter, a multi-fiber adapter, a cover, a single optical fiber, an optical signal splitter, a multi-fiber assembly, and a mechanical transfer ferrule. The cover may include a first end and a second end and further may define a longitudinal axis. The single fiber adapter may be coupled to the first end along the longitudinal axis. The multi-fiber adapter may be coupled to the second end along the longitudinal axis. The single optical fiber may be positioned within the cover along the longitudinal axis and may be at least partially received in the single fiber adapter. The splitter may be positioned within the cover along the longitudinal axis and may be directly coupled to the single optical fiber. The multi-fiber assembly may be positioned within the cover along the longitudinal axis and may be directly coupled to the splitter. The mechanical transfer (MT) ferrule may be positioned within the cover along the longitudinal axis and may be directly coupled to the multi-fiber assembly and to the multi-fiber adapter such that the single fiber adapter may be in optical communication with the multi-fiber adapter via the single optical fiber, the splitter, the multi-fiber assembly, and the MT ferrule.

In some arrangements, the splitter may be optically coupled to the single optical fiber and the multi-fiber assembly. In some such arrangements, the MT ferrule may be optically coupled to the multi-fiber assembly.

In some arrangements, the splitter may be wavelength or power distribution based as described previously and further herein. In some arrangements, a wavelength-based splitter may be a WDM or a demultiplexer depending on the optical signal routing path through the WDM or demultiplexer.

In accordance with another aspect, an optical cable may include a fiber optic connector and an LC cable. The fiber optic connector may include a single fiber adapter, a multi-fiber adapter, a cover, a single optical fiber, an optical signal splitter, a multi-fiber assembly, and a mechanical transfer ferrule. The cover may include a first end and a second end and further may define a longitudinal axis. The single fiber adapter may be coupled to the first end along the longitudinal axis. The multi-fiber adapter may be coupled to the second end along the longitudinal axis. The single optical fiber may be positioned within the cover along the longitudinal axis and may be at least partially received in the single fiber adapter. The splitter may be positioned within the cover along the longitudinal axis and may be directly coupled to the single optical fiber. The multi-fiber assembly may be positioned within the cover along the longitudinal axis and may be directly coupled to the splitter. The mechanical transfer (MT) ferrule may be positioned within the cover along the longitudinal axis and may be directly coupled to the multi-fiber assembly and to the multi-fiber adapter such that the single fiber adapter may be in optical communication with the multi-fiber adapter via the single optical fiber, the splitter, the multi-fiber assembly, and the MT ferrule. The LC cable may be coupled to the single fiber adapter of the fiber optic connector. The LC cable may be in optical communication with the multi-fiber adapter via the single optical fiber, the splitter, the multi-fiber assembly, and the MT ferrule. An optical signal conveyed by the LC cable may be split into multiple optical signals and routed by a plurality of optical fibers extending within the MT ferrule.

In some arrangements, the splitter may be wavelength or power distribution based as described previously and further herein. In some arrangements, a wavelength-based splitter may be a WDM or a demultiplexer depending on the optical signal routing path through the WDM or demultiplexer.

In some arrangements, the optical cable may further include a mechanical push-on (MPO) breakout adapter that may be coupled to the multi-fiber adapter of the fiber optic connector. The MPO breakout adapter may be in optical communication with the LC cable via the single optical fiber, the splitter, the multi-fiber assembly, and the MT ferrule. The multiple optical signals routed by the plurality of optical fibers extending within the MT ferrule are further routed by corresponding optical fibers extending with the MPO breakout adapter.

In accordance with another aspect, an MT ferrule may include an upper cover portion, a lower cover portion that may be mated to the upper cover portion, and a plurality of optical fibers. Each of the upper and the lower cover portions may be made of glass, ceramic. or another suitable material. The plurality of optical fibers may extend between the upper and the lower cover portions within fiber holes defined by fiber grooves extending along the upper and the lower cover portions.

In some arrangements, the MT ferrule may include a plurality of alignment pins. The alignment pins may extend between the upper and the lower cover portions within pin holes defined by pin grooves extending along the upper and the lower cover portion. The alignment pins further may extend beyond adjacent ends of the upper and lower cover portions.

BRIEF DESCRIPTION OF THE DRAWINGS

By way of example only, embodiments of the present disclosure will be described herein with reference to the accompanying drawings, in which:

FIG. 10A is a perspective view of splitter component integrated adapter in accordance with another embodiment;

FIG. 10B is an exploded view of a signal splitting cable, including the splitter component integrated adapter of FIG. 10A, in accordance with another embodiment;

FIG. 11 is perspective view of an optical fiber and ferrule assembly of the splitter component integrated adapter shown in FIG. 10A;

DETAILED DESCRIPTION

Figure 1:
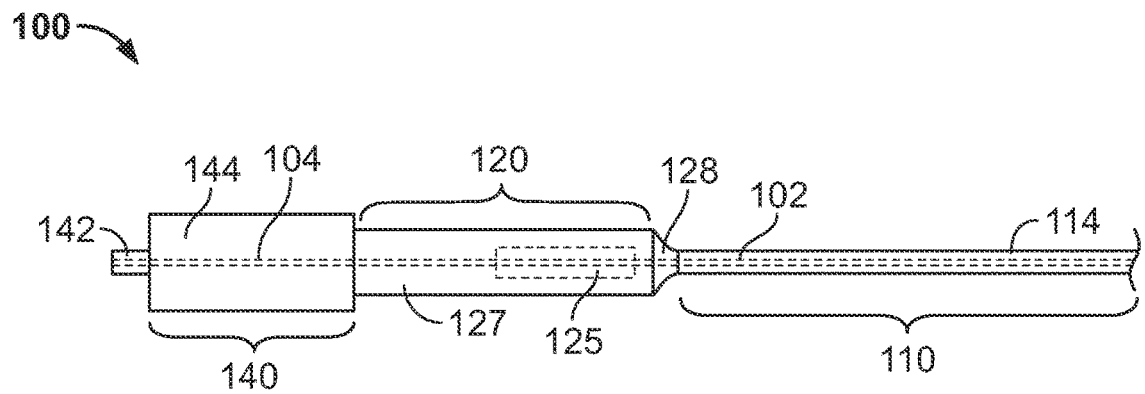
FIG. 1 is an elevation view of a portion of an optical cable in accordance with an embodiment.

Referring now to the drawings, as shown in FIG. 1, cable 100 includes inner cable section 110, componentry section 120, and connector section 140. In the example shown, cable 100 may be used to route one or more optical signals each formed by a light beam.

Inner cable section 110 includes an inner portion of inner optical fiber 102 configured to route an optical signal and jacket 114 surrounding and substantially coaxial with the inner optical fiber. In certain alternative arrangements configured for routing a plurality of optical signals, the inner cable section may include a plurality of inner portions of inner optical fibers 102. Jacket 114 may be but is not limited to being made of a flexible plastic material such as but not limited to polyvinyl chloride (PVC).

As in the example shown, componentry section 120 may include an outer portion of inner optical fiber 102, an inner portion of outer optical fiber 104, optical unit 125 which may be optically connected with the outer portion of inner optical fiber 102 and the inner portion of outer optical fiber 104, and componentry cover 127. As shown, componentry cover 127 surrounds each of the outer portion of inner optical fiber 102, the inner portion of outer optical fiber 104, and the optical unit to provide a cover and inhibit disassembly of the optical fibers from the optical unit. Componentry cover 127 may be but is not limited to being made of a plastic material, which preferably may be a moldable plastic, or a metal material, e.g., stainless steel, formable in the shape of a housing, and preferably a flexible housing. As in the example shown, componentry cover 127 and jacket 114 may interface at round 128 that may provide strain relief at the interface upon tensioning of either one or both of the componentry cover and the jacket.

Optical unit 125 may be configured to any one or any combination of (i) route or receive an optical signal from inner optical fiber 102, (ii) route or receive an optical signal from outer optical fiber 104, (iii) route or convey an optical signal to the outer optical fiber, and (iv) route or convey an optical signal to the inner optical fiber. In some arrangements in response to a first optical signal being received by optical unit 125 from inner optical fiber 102 or outer optical fiber 104, optical unit 125 may functionally act upon, e.g., filter or amplify, the first optical signal and then convey a second optical signal resulting from the functional action on the first optical signal to the other of the inner optical fiber or outer optical fiber, respectively. In some such arrangements or in alternative arrangements in response to a first optical signal being received by optical unit 125 from inner optical fiber 102 or outer optical fiber 104, optical unit 125 may convey a second optical signal to the other of the inner optical fiber or outer optical fiber, respectively.

Optical unit 125 may include any one or any combination of a termination unit, one or more filters or filter modules such as but not limited to an optical tap filter, a splitter device, a coupler device, a reflector, an attenuator, a dispersion compensator, an electro-optical element such as but not limited to a tap photodiode array that may receive both optical signals that may be conveyed by optical fibers and electrical signals that may be conveyed by electrical wires, and other optical componentry.

An optical unit including an optical signal splitter or coupler device may enable N×M optical fiber coupling. In this manner, inner optical fiber 102 may be a plurality of optical fibers that route an optical signal to or from a single outer optical fiber 104, the inner optical fiber may be a single optical fiber that routes one or more optical signals to or from a plurality of outer optical fibers, or the inner optical fiber may be a plurality of optical fibers that route one or more optical signals to or from a plurality of outer optical fibers.

The optical signal splitter or coupler device may be wavelength or power distribution based. In one example of a wavelength-based splitter or coupler device, such device may be a wavelength-division multiplexer (WDM) or other dielectric filter that may receive either the first optical signal or the second optical signal and route a first wavelength of the respective first optical signal or second optical signal and separately route a second wavelength of the respective first optical signal or second optical signal different from the first wavelength to the respective first inner optical fiber or first outer optical fiber, as the case may be. In one example of a power distribution-based splitter or coupler device, such device may be an optical fiber tap that may divert a portion of either the first optical signal or the second optical signal, when received by the optical fiber tap, as the other of the respective first optical signal or second optical signal and convey such diverted optical signal along the optical fiber tap. In some arrangements, the optical fiber tap may run parallel with the respective first inner optical fiber or first outer optical fiber, as the case may be.

An optical unit including an electro-optical component may be attached to an electrical wire such that the electro-optical component conveys an electrical signal from the electrical wire and further may convey an optical signal from either the first inner optical fiber or the first outer optical fiber. In some arrangements, the electrical wire may be within jacket 114 acting as a cover for both the first inner optical fiber and the electrical wire or may extend along an outer surface of the jacket. The integration of optical unit 125 provides a cable with enhanced functionality over cables known in the art.

Still referring to FIG. 1, connector section 140 includes ferrule 142 surrounding and substantially coaxial with an outer portion of outer optical fiber 104 and connector cover 144 surrounding and substantially coaxial with the ferrule. Ferrule 142 provides support for the optical fiber and aligns an end of the outer optical fiber for a mating connection with a terminal or other termination unit such that an optical signal may be routed through the end of the outer optical fiber in a controllable manner. In some arrangements, connector cover 144 may be attached to componentry cover 127 by an adhesive, e.g., epoxy, through a locking or other mechanical engagement between the connector cover and the componentry cover, such as by way of a tongue-and-groove, snap-fit, Morse taper, or other system for directly anchoring one of these components to the other, or through the use of fasteners known to those skilled in the art. In other arrangements, connector cover 144 may be integral with componentry cover 127 such that the connector cover and the componentry cover are inseparable without fracture of either one or both of these components.

Figure 2A:
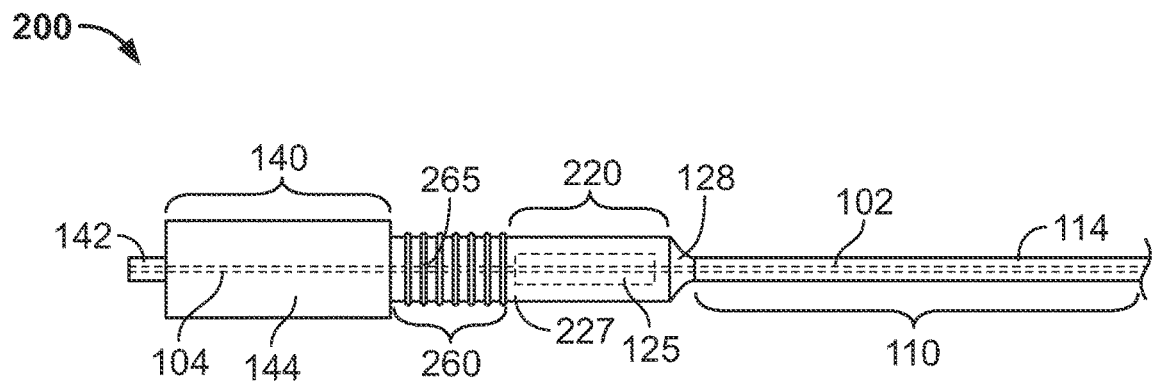
FIGS. 2A, 2B, and 2C are elevation views of portions of an optical cable in accordance with another embodiment.
Figure 2B:
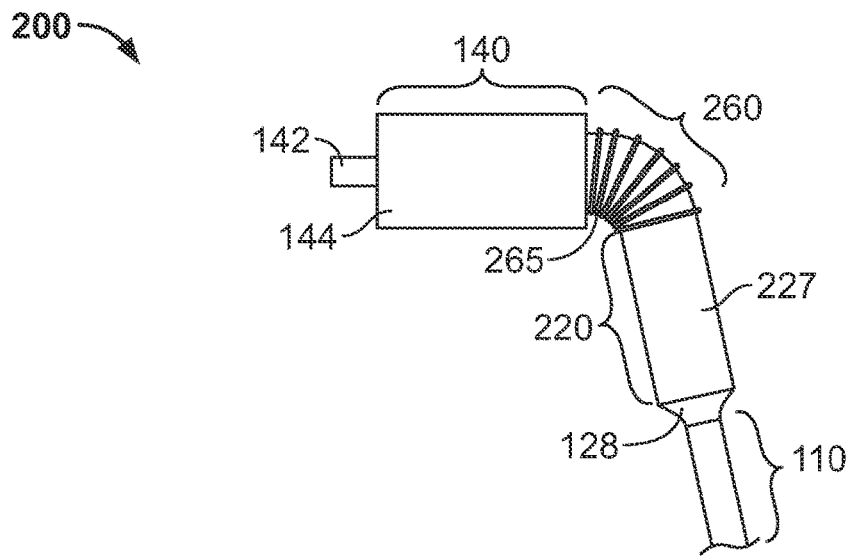

Referring now to FIGS. 2A and 2B, cable 200 is the same or substantially the same as cable 100 with the exception that cable 200 includes componentry cover 227 of componentry section 220 in place of componentry cover 127 and further includes flexible, i.e., bendable, cover 260. In the examples shown, componentry cover 227 is the same or substantially the same as componentry cover 127 with the exception that componentry cover 227 is shorter than componentry cover 127 as shown by a comparison between cable 100 and cable 200 and that componentry cover 227 is adjacent to flexible cover 260 rather than connector cover 144. In alternative arrangements, componentry covers in the forms of componentry covers 127 and 227 may have longer or shorter lengths or even the same length relative to each other. In some arrangements, flexible cover 260 may be attached to componentry cover 227 by an adhesive, e.g., epoxy, through a locking or other mechanical engagement between the connector cover and the componentry cover, such as by way of a tongue-and-groove, snap-fit, Morse taper, or other system for directly anchoring one of these components to the other, or through the use of fasteners known to those skilled in the art. In other arrangements, flexible cover 260 may be integral with componentry cover 227 such that the flexible cover and the componentry cover are inseparable without fracture of either one or both of these components. In some arrangements, flexible cover 260 may be attached to connector cover 144 by an adhesive, e.g., epoxy, or fasteners known to those skilled in the art. In other arrangements, flexible cover 260 may be integral with connector cover 144 such that the flexible cover and the connector cover are inseparable without fracture of either one or both of these components.

As shown in FIG. 2B, flexible cover 260 may include bellows 265 that expand, contract, and bend to provide the flexible cover with flexibility. As in the example shown, bellows 265 may be sufficiently rigid such that the bellows maintain a bent or straight state until cable 200 is acted upon by an external force sufficiently to change the bent or straight state of the bellows. As used herein, an "external force" is a force exerted upon a structure that is not a force between internal components, i.e., an "internal force," of that structure. In this manner, gravity or human contact acting upon a structure are considered to be external forces in the context of this disclosure. When bellows 265 are in a bent state as in FIG. 2B, a greater portion of componentry section 220 is closer to connector section 140 than when the bellows are in a straight state as in FIG. 2A. In this manner, an external force applied against any one of inner cable section 110, componentry section 220, and an inner portion of bellows 265 between componentry section 220 and the bend in the bellows when the bellows are in the bent state will apply a torque to connector section 140 that is less than a torque applied to the connector section by the same external force applied at the same location along cable 200 when bellows 265, and thus cable 200, are in the straight state. As such, cable 200 limits torsional stress on cable 200 and its attached components while at the same time providing a compactable cable to fit into tighter spaces as necessary.

Flexible cover 260 may be in the form of a bendable metal tube. Various metals may be used for this application including but not limited to stainless steel, copper, and nickel, as well as alloys and combinations of such metals. In this manner, flexible cover 260 may be in the form of shafts used to support desk lamps or shafts used for endoscopic tubing. Other materials such as a structured plastic, e.g., in the form of bellows, may also be used. Flexible cover 260 may be prepared with a preset length. In this manner, flexible cover 260 may be bendable to at most an angle corresponding to a minimum bending radius for outer optical fiber 104, and preferably to an angle corresponding to a radius slightly larger than the minimum bending radius for the outer optical fiber.

In an alternative arrangement of cable 200, cover 260 may not be flexible and instead may be permanently bent at a preset angle such that bending the cover by any significant amount, for example to an angle 5%-20% greater than the preset angle, may fracture the cover. The rigidity of such cable arrangements may provide additional protection to optical unit 125 that may be incorporated into the cable and may avoid partial straightening the cover after bending that may be present in some arrangements of flexible cover 260 due to elasticity.

Figure 2C:
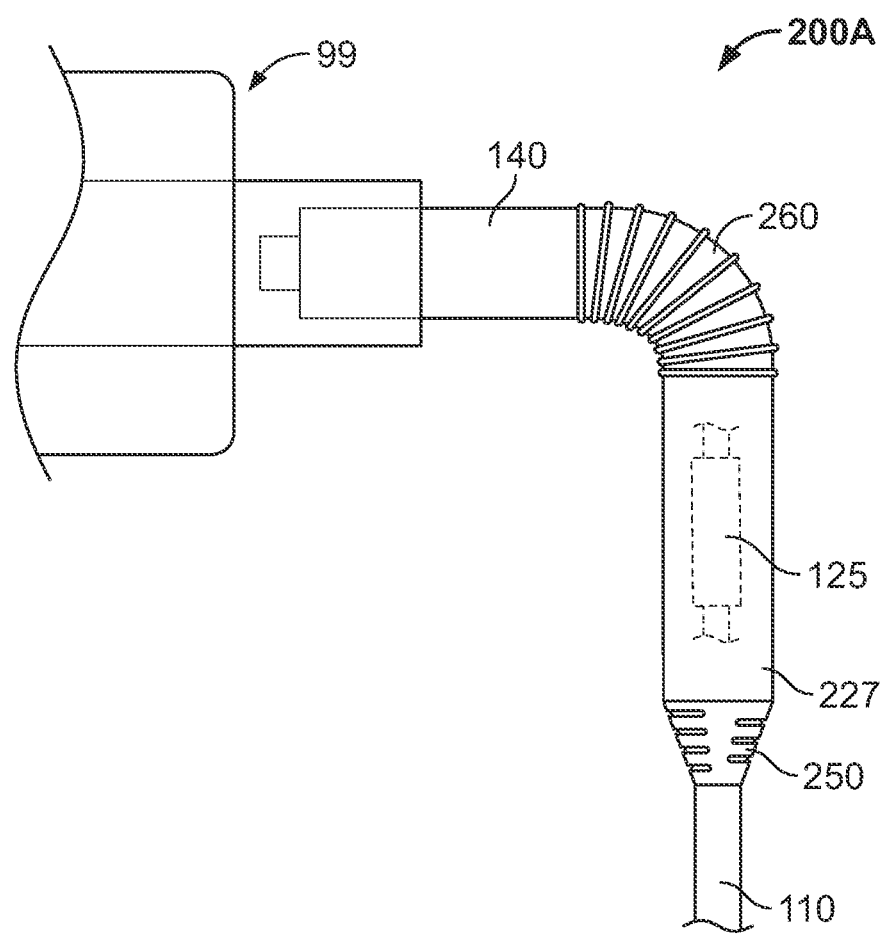

Arrangements of flexible cover 260 may be used with a permanently bent boot, as known to those skilled in the art, that may be placed over the interface of flexible cover 260 and componentry cover 227, the componentry cover 227, and the interface of componentry cover 227 and inner cable section 110 or a straight boot as known to those skilled in the art placed over componentry cover 227 and the interface of componentry cover 227 and inner cable section 110. As shown in FIG. 2C in which cable 200A is inserted into a receptacle of a termination unit 99, e.g., equipment, a patch panel, an adapter, arrangements of permanently bent cover or flexible cover 260 may be used with a straight boot 250, which may be flexible, as known to those skilled in the art. As further shown, boot 250 may be placed at the interface of componentry cover 227 and inner cable section 110.

In certain alternative arrangements, either one or both of a plurality of inner optical fibers 102 and a plurality of outer optical fibers 104 may extend through the componentry cover, such as componentry covers 127, 227. In such arrangements, optical unit 125 may be configured to any one or any combination of (i) route or receive respective optical signals from any one or any combination of the plurality of inner optical fibers 102, (ii) route or receive respective optical signals from any one or any combination of the plurality of outer optical fibers 104, (iii) route or convey respective optical signals to the plurality of outer optical fibers, and (iv) route or convey respective optical signals to the plurality of inner optical fibers.

Figure 3:
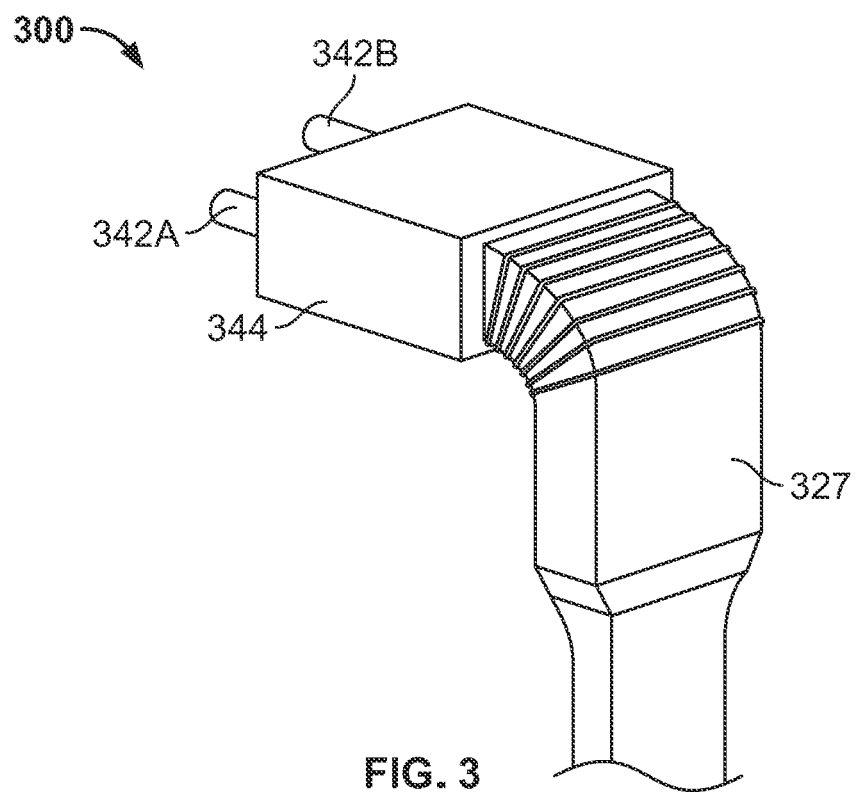
FIGS. 3-6B are perspective views of portions of optical cables in accordance with further embodiments.
Figure 4:
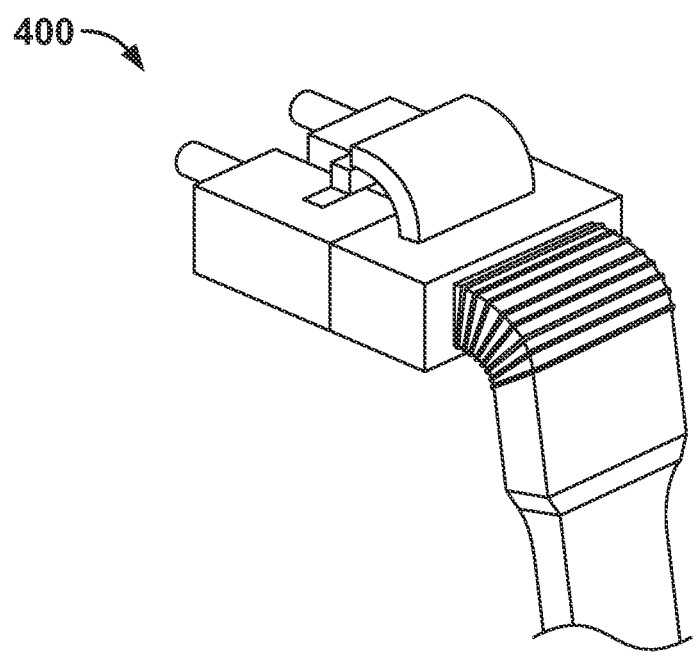

With reference to FIG. 3, cable 300 is a duplex connector that is the same as or substantially the same as cable 200 with the exception that cable 300 includes dual ferrules 342A, 342B in place of single ferrule 142 as well as a larger componentry cover 327 and a larger connector cover 344 than the corresponding components of cable 200. Each of dual ferrules 342A, 342B surrounds and is substantially coaxial with outer portions of a plurality of outer optical fibers 104 and further is surrounded by connector cover 344. Each of dual ferrules 342A, 342B provides support for the corresponding outer optical fiber 104 and aligns an end of the corresponding outer optical fiber for a mating connection with a terminal or other termination unit such that an optical signal may be routed through the end of the outer optical fiber in a controllable manner. In another arrangement as shown in FIG. 4, cable 400 is an LC duplex connector that is the same as or substantially the same as cable 300 with the exception that cable 400 includes clips for snap-fit connection as known to those skilled in the art with respect to LC connectors.

Figure 5A:
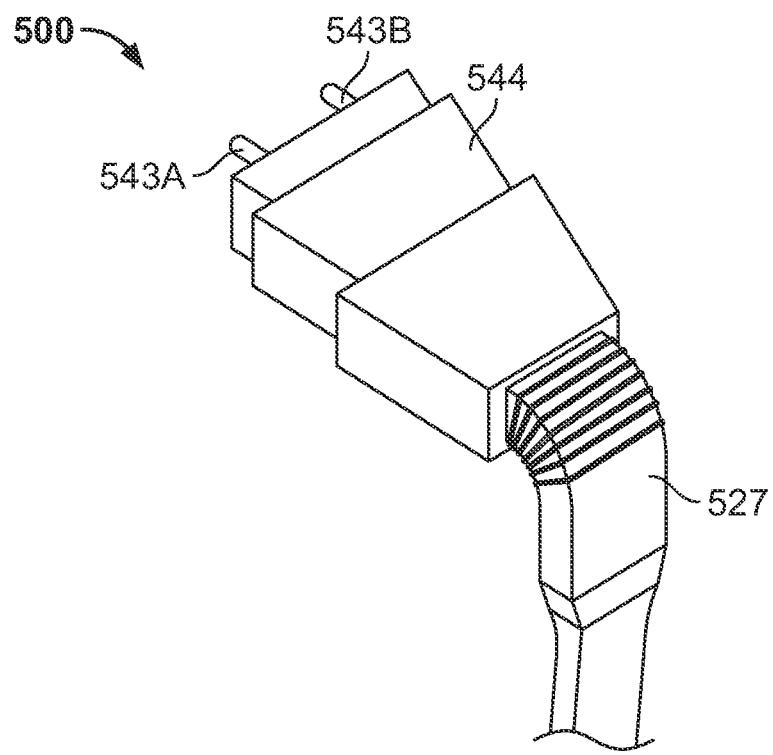
Figure 5B:
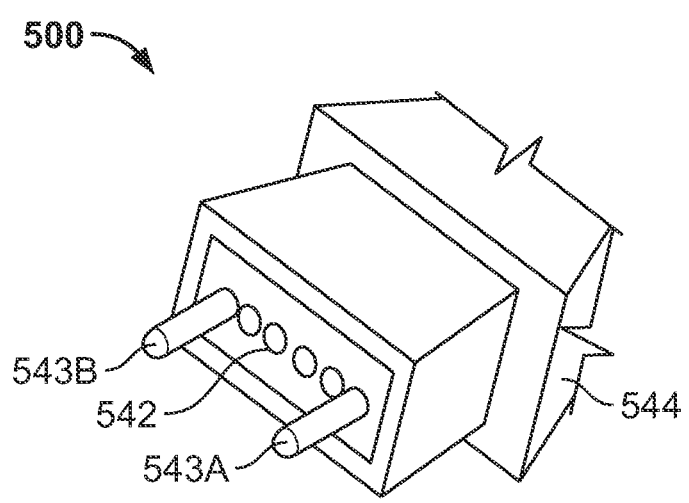

Referring now to FIGS. 5A and 5B, cable 500 is a multi-fiber push on (MPO) connector and is a significant enhancement over MPO connectors such as the MTP® by US Conec Ltd. Cable 500 is the same as or substantially the same as cable 200 with the exception that cable 500 includes a multi-hole ferrule 542 in place of the single hole ferrule 142 as well as a larger componentry cover 527 and a larger connector cover 544 than the corresponding components of cable 200. The outer portions of a plurality of outer optical fibers 104 are substantially coaxial with and surrounded by respective holes of ferrule 542. Ferrule 542 is surrounded by connector cover 544. In some arrangements, connector cover 544 may act as a housing that includes a connector body surrounding the ferrule, slideable cover surrounding the connector body, and latch portions for engagement with counterpart latch portions, e.g., hooks, of an adapter or other termination unit to couple the housing and thus the cable to the termination unit, as known to those skilled in the art. As shown in the example of FIG. 5B, connector cover 544 defines an end of the holes of ferrule 542. Ferrule 542 provides support for each of outer optical fibers 104 and aligns an end of each of the outer optical fibers for a mating connection with a terminal or other termination unit such that an optical signal may be routed through the end of each of the outer optical fibers in a controllable manner.

As further shown in FIGS. 5A and 5B, cable 500 further includes alignment pins 543A, 543B extending from the exposed end of the connector cover 544. Alignment pins 543A, 543B are preferably located on opposing sides of the ferrule 542, as shown, but in other arrangements, the alignment pins may extend from other positions of the connector cover, including from other positions of the exposed end of the connector cover or even from one or more sides of the connector cover. At least a portion of any such alignment pins may extend in a direction that ferrule 542, and thus optical fibers extending in the ferrule, extend such that the alignment members may be received in a housing of a terminal or other termination unit to maintain stability of the connection between cable 500 and such terminal or other termination unit.

Figure 6A:
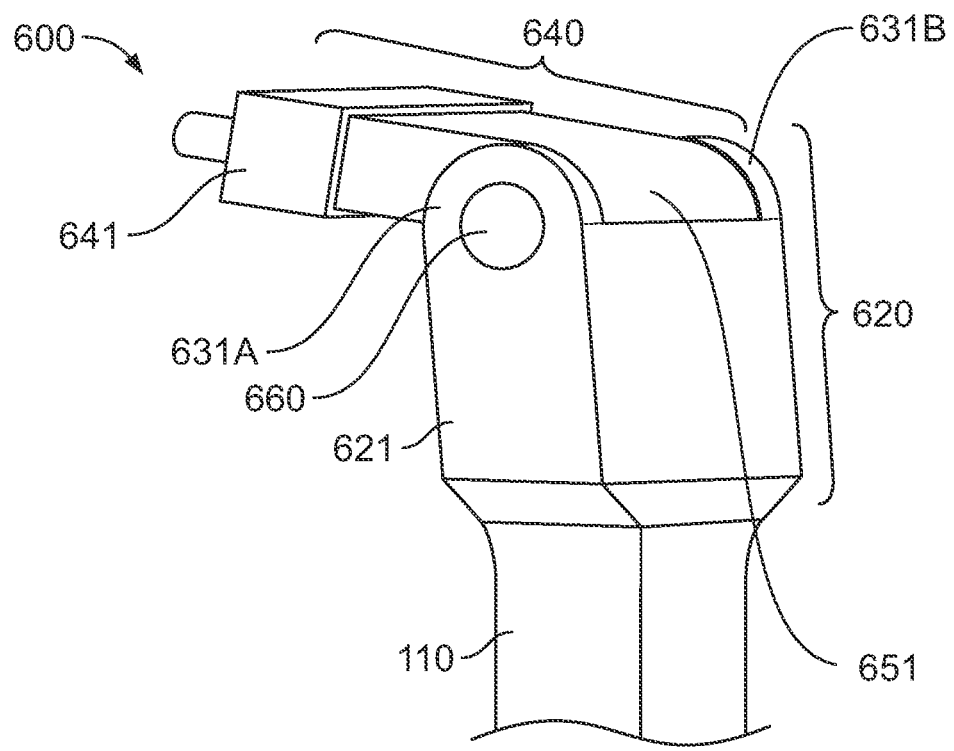
Figure 6B:
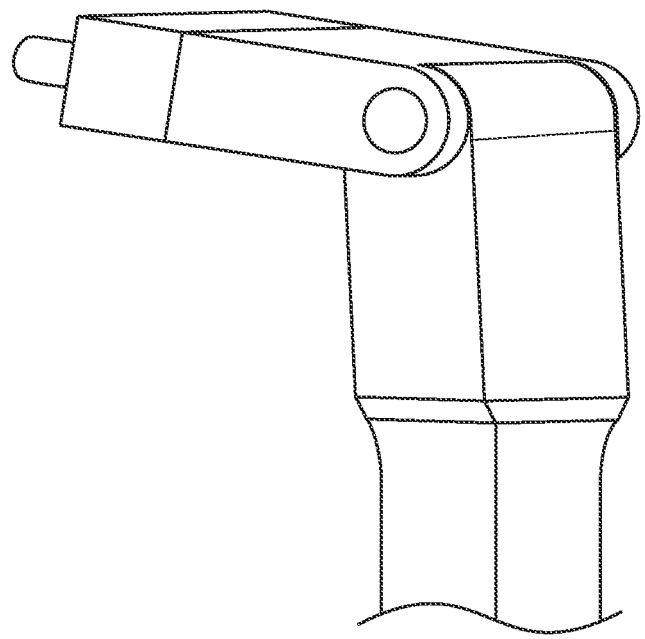

Referring now to FIG. 6A, cable 600 is the same as or substantially the same as cable 200 with the exception that cable 600 includes componentry section 620 in place of componentry section 220, connector section 640 in place of connector section 140, and at least one hinge pin 660 in place of flexible cover 260. Componentry section 620 is the same as or substantially the same as componentry section 220 with the exception that componentry section 620 further includes parallel arms 631A, 631B extending from componentry cover body 621. Connector section 640 is the same as or substantially the same as connector section 140 with the exception that connector section 640 further includes arm 651 extending from connector cover body 641. As shown, arms 651 may be configured to fit between parallel arms 631A, 631B, while in alternative arrangements, the configuration may be reversed such that an arm extending from the componentry cover body may be configured to fit between parallel arms extending from the connector cover body, such as in the example of cable 600' shown in FIG. 6B, or the configuration may be altered such that parallel arms of the connector section alternate with parallel arms of the componentry section. Single hinge pin 660 extends through holes defined by each of arms 631A, 631B, 651 or, in other arrangements, a hinge pin extends through the holes in only arms 631A, 651 and another hinge pin extends through holes in only arms 631B, 651. In this manner, connector section 640 may be rotated relative to componentry section 620 in order to bend cable 600. In some arrangements in the form of cable 600, the hinge pin may be integral with connector section 640 such that the hinge pin is a protrusion from the connector section, while in arrangements in the form of cable 600', the hinge pin may be integral with the componentry cover body such that the hinge pin is a protrusion from the componentry cover body.

Like componentry section 220, componentry section 620 surrounds optical unit 125 and includes a passageway through which portions of inner optical fiber 102 and outer optical fiber 104 extend. Like connector section 240, connector section 640 includes a passageway through which a portion of outer optical fiber 104 extends. Outer optical fiber 104 may extend between dual hinge pins 660 inserted into respective arms 631A, 631B, 651 or extend around a single hinge pin 660 inserted into all three of the arms.

In some arrangements, the inner arm, e.g., arm 651, may extend such that it is compressed by the outer arms, e.g., arms 651A, 651B. Such compression may be sufficient such that an external force applied to cable 600 is needed to bend connector section 640 relative to componentry section 620 from an initial state to a different, bent or straight, state. In some arrangements, at least one hinge pin 660 may be inserted both in a press fit into at least one arm of arms 631A, 631B of componentry section 620 and in a press fit into arm 651 of connector section 640. In this manner, componentry section 620 may be inhibited from rotating relative to connector section 640 such that that an external force applied to cable 600 is needed to bend connector section 640 relative to componentry section 620 from an initial state to a different, bent or straight, state. In still other arrangements, componentry section 620 may be attached to connector section 640 to create a ratcheting effect whereby connector section 640 rotates in a single direction to a bent state and does not rotate in the opposite direction until a release button on either the componentry section or the connector section is depressed to allow passage of teeth on the other of the componentry section or the connector section to bypass a lever or step attached to or engaged with the release button. Such a configuration may be used to prevent any rotation or at least any significant rotation of componentry section 620 relative to connector section 640 until the release button is depressed.

When cable 600 is in a bent state as in FIG. 5, a greater portion of componentry section 620 is closer to connector section 640 than when cable 600 is in a straight state. In this manner, an external force applied against inner cable section 110 or componentry section 620 when cable 600 is in the bent state will apply a torque to connector section 640 that is less than a torque applied to the connector section by the same external force applied at the same location along cable 600 when cable 600 is in the straight state. As such, cable 600 limits torsional stress on cable 600 while at the same time providing a compactable cable to fit into tighter spaces as necessary.

Figure 7A:
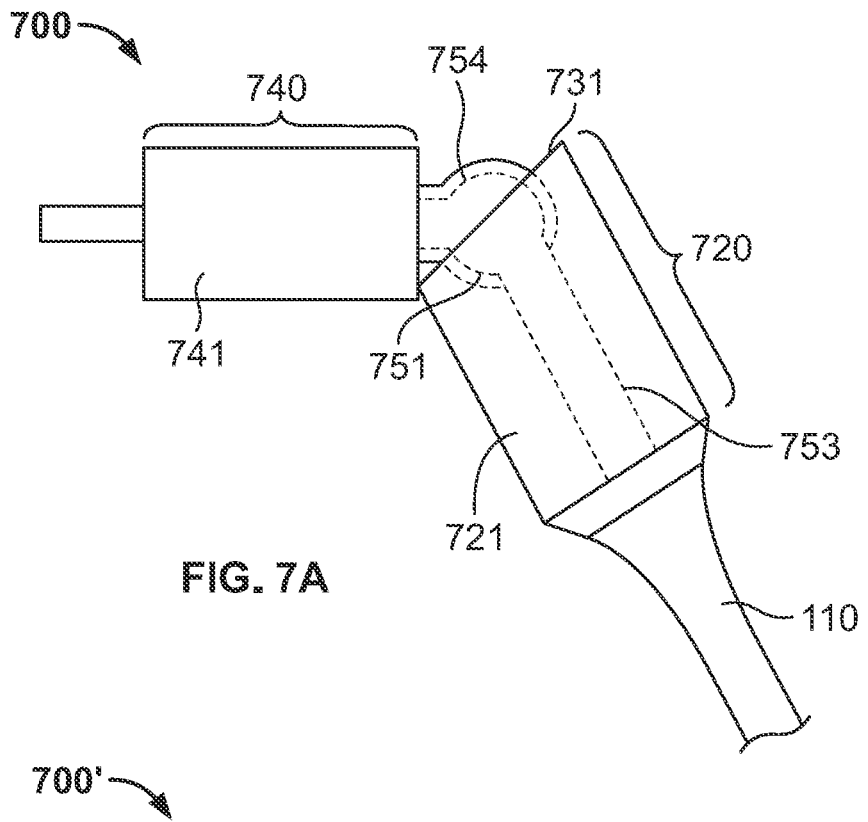
FIGS. 7A and 7B are elevation views of portions of optical cables in accordance with further embodiments.
Figure 7B:
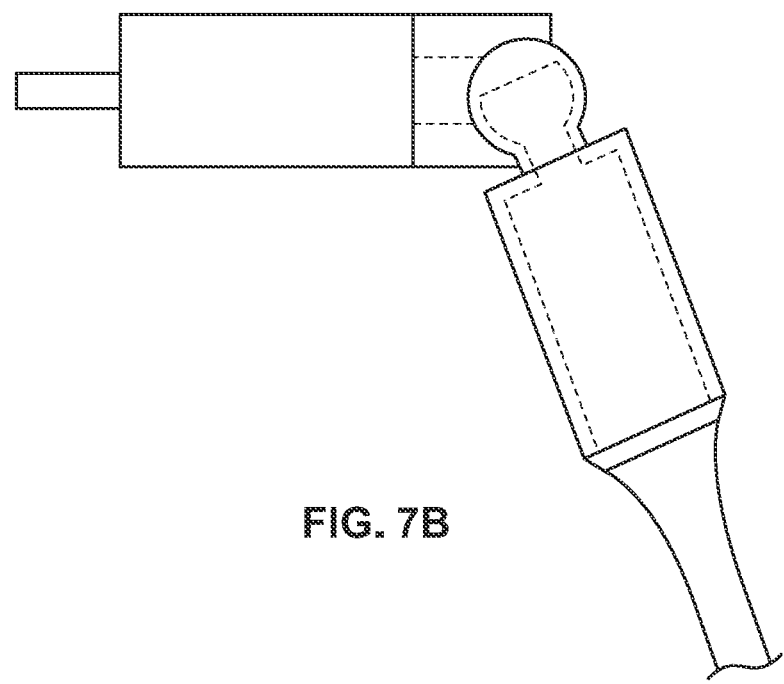

Referring now to FIG. 7A, cable 700 is the same as or substantially the same as cable 600 with the exception that cable 700 includes componentry section 720 in place of componentry section 620, connector section 740 in place of connector section 640, and does not include hinge pin 660. Componentry section 720 is the same as or substantially the same as componentry section 620 with the exception that componentry section 720 includes lip 731 extending from componentry cover body 721 to define a socket in place of parallel arms 631A, 631B extending from componentry cover body 621. Connector section 740 is the same as or substantially the same as connector section 640 with the exception that connector section 740 includes ball portion 751 extending from connector cover body 741 in place of parallel arms 651A, 651B extending from connector cover body 641. As shown, ball portion 751 may be configured to fit within the socket defined by lip 731 and componentry cover body 721, while in alternative arrangements, the configuration may be reversed such that the lip may extend from the connector cover body and the ball portion may extend from the componentry cover body, such as in the example of cable 700' shown in FIG. 7B. As such, the ball portion and the socket define a ball-and-socket joint, and connector section 740 may be rotated relative to componentry section 720 in order to bend cable 700. Like componentry section 620, componentry section 720 surrounds optical unit 125 and includes passageway 753 through which portions of inner optical fiber 102 and outer optical fiber 104 extend. Like connector section 640, connector section 740 includes passageway 754 through which a portion of outer optical fiber 104 extends.

In some arrangements, ball portion 751 may be inserted in a press fit into the socket defined by lip 731 and cover body 721. In this manner, componentry section 720 may be inhibited from rotating relative to connector section 740 such that that an external force applied to cable 700 is needed to bend connector section 740 relative to componentry section 720 from an initial state to a different, bent or straight, state.

When cable 700 is in a bent state as in FIG. 7A, a greater portion of componentry section 720 is closer to connector section 740 than when cable 700 is in a straight state. In this manner, an external force applied against inner cable section 110 or componentry section 720 when cable 700 is in the bent state will apply a torque to connector section 740 that is less than a torque applied to the connector section by the same external force applied at the same location along cable 700 when cable 700 is in the straight state. As such, cable 700 limits torsional stress on cable 700 while at the same time providing a compactable cable to fit into tighter spaces as necessary.

Figure 8:
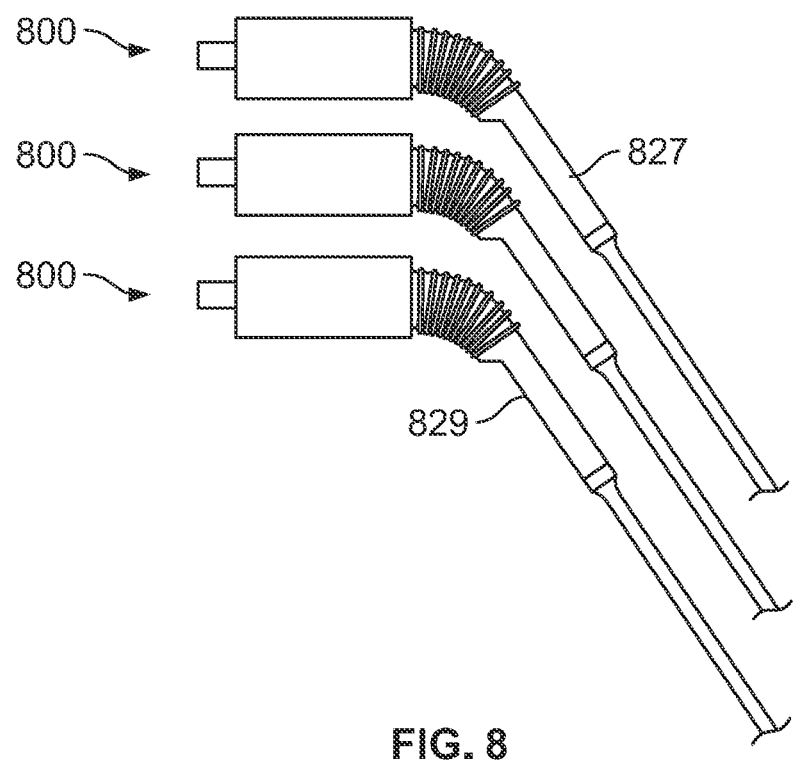
FIG. 8 is a plan view of a system of optical cables in accordance with another embodiment.

Referring now to FIG. 8, each of cables 800 is the same as or substantially the same as cable 200 with the exception that each cable 800 includes componentry cover 827 of componentry section 820 in place of componentry cover 227 of componentry section 220. Componentry cover 827 is the same as componentry cover 227 with the exception the componentry cover 827 includes notch 829 defining at least one longitudinal edge of the componentry cover. As shown in FIG. 8, a first cable 800 may be placed adjacent to an additional cable 800 when both cables are in a bent state such that a portion of the first cable fits within notch 829 of the additional cable. In this manner, as further shown, the first cable 800 may be bent and placed adjacent to the additional cable 800, which is bent, such that a longitudinal edge of the first cable opposite notch 829 of the first cable closely follows a longitudinal edge of the additional cable 800.

Figure 9:
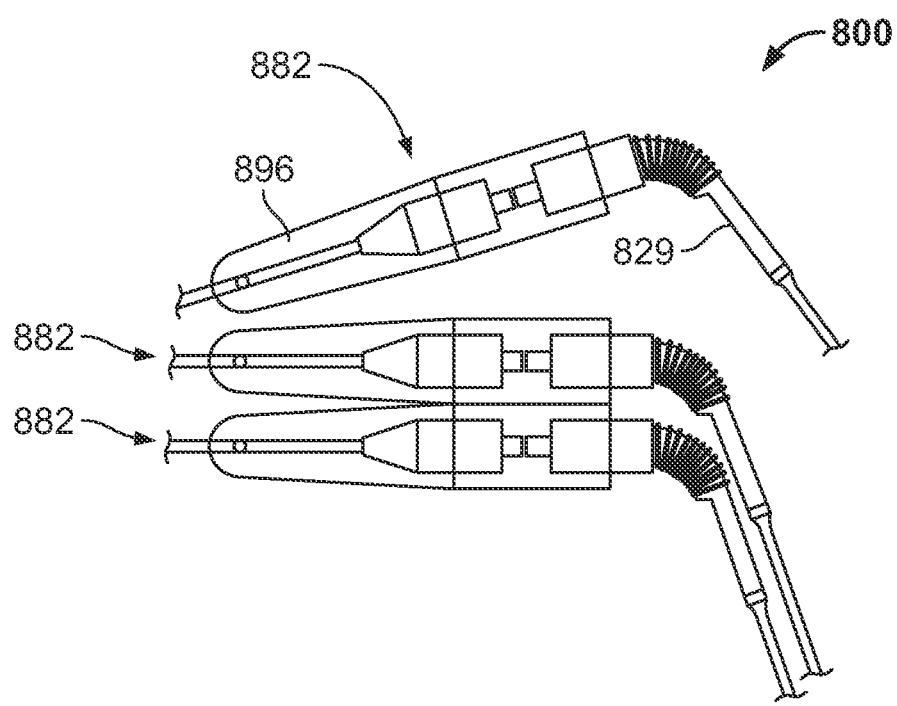
FIG. 9 is a plan view of the system of optical cables of FIG. 8 coupled to a portion of a patch panel device in accordance with another embodiment.

As shown in FIG. 9, cables 800 may be operatively coupled to attachment members 882 of a patch panel device in which certain of the cables may be operatively coupled with movable members 896 of the attachment members that allow such cables to be moved away from other cables for easier access in inserting and removing the cables, as described more fully in U.S. Pat. Nos. 8,939,792 B2; 9,851,523 B2; and U.S. patent application Ser. No. 15/917,965, the disclosures of which are hereby incorporated by reference in their entireties. Due to notch 829, and further in light of movable members 896, cables 800 may be inserted into respective ports attached to attachment members 882 even while the cables are in the bent state.

Referring now to FIGS. 10A and 10B, splitter component integrated adapter 905 includes LC adapter 910, single fiber assembly 920 having a first end mated to an inner end of the LC adapter, splitter 930 having a first end mated to a single fiber end of the single fiber assembly, multi-fiber ribbon assembly 940 having a closed end mated to a multi-fiber end of the splitter, mechanical transfer (MT) ferrule 950 having an inner end mated to an open end of the multi-fiber ribbon assembly 940, and mechanical push-on (MPO) adapter 960 having an inner end for receipt of an outer end of the MT ferrule. As shown, LC input cable 970 may be inserted into an outer end of LC adapter 910 opposite the inner end of the LC adapter to form an input cable with connector, the connector being an outer end of MPO adapter 960 opposite the inner end of the MPO adapter. As further shown, MPO breakout cable 980 may be inserted into the outer end of MPO adapter 960 to form an output cable. LC input and MPO breakout cables 970, 980 may be inserted into the outer ends of integrated adapter 905 to form signal splitting cable 900. In this manner, integrated adapter 905 serves to convert an optical signal, e.g., an optical input, along a single fiber of LC input cable 970, to multiple optical signals, e.g., a plurality of parallel optical outputs conveyed by breakout cable 980 and formed by splitting the optical signal conveyed by the LC input cable. Signal splitting cable 900 may be used, for example, to make a passive optical network (PON) architecture connection. In some arrangements, the PON connection may be used to evenly distribute power coming from a central location to separate locations, e.g., power from a service provider distributed t a city or town may be split and be evenly distributed to separate homes within the city or town. In some other arrangements, the PON connection may allow for an uneven distribution of power, e.g., to allow for tapping into a signal to monitor the signal's quality. In some such arrangements, the power may be distributed very unevenly, e.g., only 5% of the power may be tapped with the remaining power continuing along the same routing.

In the example shown, LC input cable 970, LC adapter 910, splitter 930, MPO adapter 960, and MPO breakout cable 980 are off-the-shelf components known to those skilled in the art while single fiber assembly 920 and multi-fiber ribbon assembly 940 are custom-made. Examples of other suitable single fiber assemblies, splitters, and multi-fiber ribbon assemblies for use with signal splitting cable 900 are shown and described at http://www.fiber-optic-tutorial.com/typical-example-of-photonic-packaging.html#more-498 and http://www.satellitebyfibre.co.uk/contents/en-uk/d111.html, the disclosures of both of which are hereby incorporated herein by reference. MT ferrule 950 shown in FIGS. 10A and 10B is an off-the-shelf plastic component known to those skilled in the art but, in some arrangements, may be replaced by glass or silicon MT ferrule shown in FIGS. 12A and 12B as discussed further herein, and in some other arrangements may be made of ceramic or metal.

As shown in FIG. 11, single fiber assembly 920 includes single optical fiber 921 extending through ferrule 922 in which the fiber is received in single fiber casing 923 as best shown in FIG. 10B and the ferrule is received in LC adapter 910. Fiber casing 923 is preferably made of an inorganic material having a thermal expansion the same as splitter 930. Such material may be but is not limited to being glass, ceramic, or metal, such that the fiber casing may withstand high temperatures during manufacture of integrated adapter 905. As in the example shown, fiber casing 923 may be in the form of a rectangular prism that acts as a ferrule for optical fiber 921 to align the fiber with the single fiber end of the single fiber assembly of splitter 930. In some alternative arrangements, the single fiber casing may be in the two-part form of multi-fiber ribbon assembly 940 with the exception that the single fiber casing may include only a single groove formed by opposing cover portions as discussed further herein with respect to the multi-fiber ribbon assembly.

As further shown in FIG. 10B, splitter 930 includes a branching network of fibers 932 encased in and maintained in the same positions relative to each other by housing 934. As in the example shown, splitter 930 may be a planar lightwave circuit (PLC) in which housing 934 preferably may be made of silica glass or other glass material having relatively high heat resistance. An end of single optical fiber 921 is aligned with an end of a single fiber on one end of the network of fibers 932 such that the single fiber of the network of fibers receives an optical signal conveyed by optical fiber 921. In this manner, the optical signal is split into a plurality of optical signals by splitter 930.

Multi-fiber ribbon assembly 940 includes upper cover portion 942, lower cover portion 944, and optical fibers 956 aligned with opposing grooves of the upper and lower cover portions, which preferably may be in the form of v-grooves, such that the optical fibers are compressed between the grooves of the upper and lower cover portions when the upper and lower cover portions are assembled together. This configuration is similar to the configuration of MT ferrule 1050 shown in FIGS. 12A and 12B. Exposed ends of optical fibers 956 on the closed end of multi-fiber ribbon assembly 940 are aligned with the multi-fiber end of splitter 930 such that optical signals routed by exposed ends of the optical fibers on the multi-fiber end of the splitter are received by the exposed ends of the optical fibers on the closed end of the multi-fiber ribbon assembly.

Figure 12A:
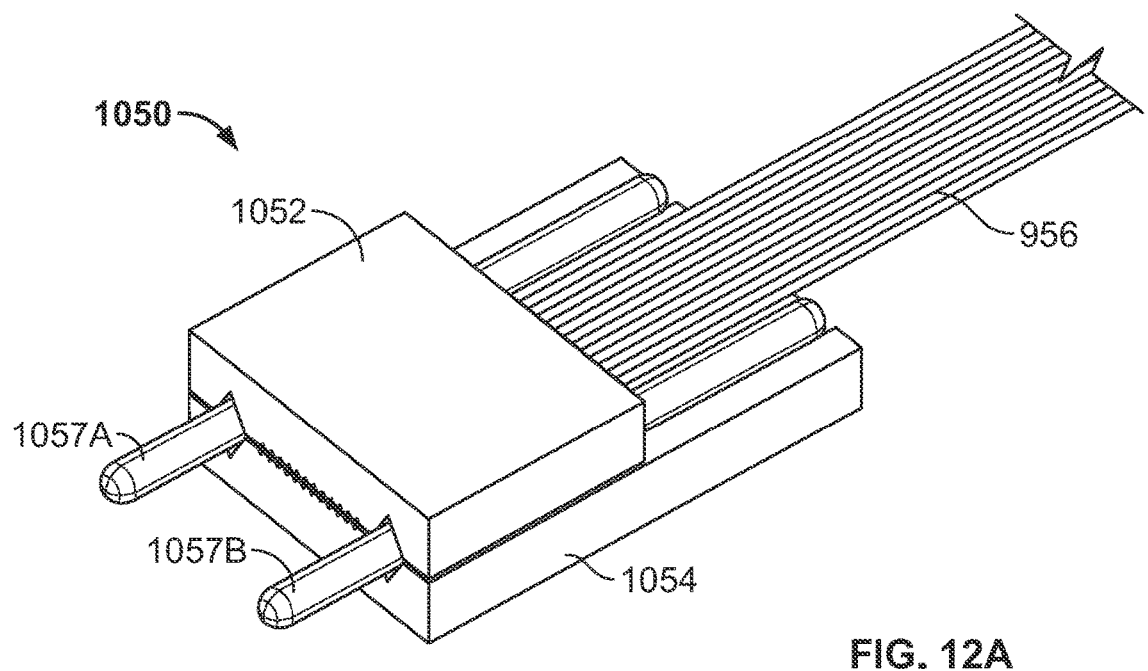
FIG. 12A is a perspective view of an MT ferrule and set of optical fibers in accordance with an embodiment.
Figure 12B:
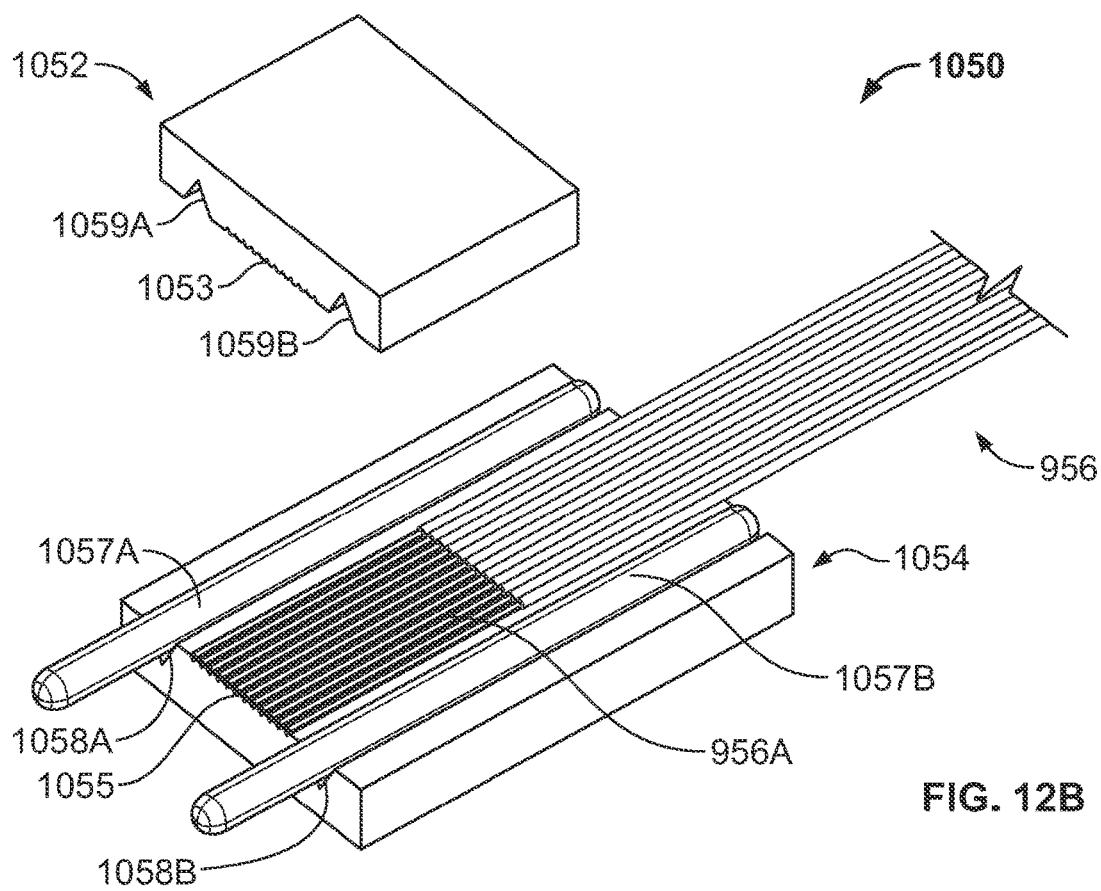
FIG. 12B is an exploded view of the MT ferrule and the set of optical fibers shown in FIG. 12A.

Portions of jackets covering each of optical fibers 956 are removed from each of the optical fibers to form unjacketed portions of the optical fibers on the closed end of multi-fiber ribbon assembly 940 (see the similar example of the unjacketed portions on the opposite ends of optical fibers 956 at the closed end of MT ferrule 1050 as shown in FIG. 12B). Jacketed portions of optical fibers 956 are inserted into the inner end of MT ferrule 950 within corresponding ports of the MT ferrule. The outer (male) end of MT ferrule 950 is inserted into the inner (female) end of MPO adapter 960. MT ferrule 950 and MPO adapter 960 are configured such that, when MT ferrule 950 is received within MPO adapter 960 and MPO breakout cable 980 is received in the MPO adapter, unjacketed ends of optical fibers 956 within the MT ferrule are aligned with ends of corresponding optical fibers within breakout connector 981 of the MPO breakout cable. Alignment pins (not shown) on breakout connector 981 may be permanently attached to and extend from an MT ferrule within a housing of the breakout connector into alignment holes 958A, 958B of MT ferrule 950 when MT ferrule 950 and MPO breakout cable 980 are inserted within MPO adapter 960 to aid in aligning optical fibers 956 within MT ferrule 950 with the optical fibers within the MT ferrule of the breakout connector. In this manner, optical signals routed by optical fibers 956 extending within MT ferrule 950 are received by the corresponding optical fibers within MPO breakout cable 980. In alternative arrangements, the alignment pins may be permanently attached to and extend from the housing of the MT ferrule and be received in corresponding alignment holes of the breakout connector when the MT ferrule and the MPO breakout cable are inserted into the MPO adapter to aid in aligning the optical fibers within the MT ferrule with the optical fibers within the breakout connector.

As further shown in FIGS. 10A and 10B, single fiber assembly 920 is mated to splitter 930 by adhesive 906 to maintain alignment of the end of optical fiber 921 on the second end of the single fiber assembly with the end of the optical fiber on the single fiber end of the splitter, and the splitter is mated to multi-fiber ribbon assembly 940 by adhesive 907 to maintain alignment of the ends of the optical fibers on the multi-fiber end of the splitter with the ends of corresponding optical fibers 956 on the closed end of the multi-fiber ribbon assembly. Additionally, adhesive 908 is applied at the interface of the open and closed ends of multi-fiber ribbon assembly 940. In this manner, adhesive 908 secures optical fibers 956 in the grooves of lower cover portion 944 of multi-fiber ribbon assembly 940. Each of adhesives 906, 907, and 908 may be but is not limited to being an epoxy.

Referring now to FIGS. 12A and 12B, MT ferrule 1050 may be used to replace MT ferrule 950. MT ferrule 1050 includes upper cover portion 1052 and lower cover portion 1054. As shown, optical fibers 956 of multi-fiber ribbon cable 955 may be inserted into and aligned along opposing cable grooves 1053, 1055 of upper and lower cover portions 1052, 1054 such that unjacketed portions 956A of the optical fibers are compressed between the cable grooves when the upper and lower cover portions are assembled together. Upper cover portion 1052 extends over only a portion of lower cover portion 1054, as further shown.

To prepare MT ferrule 1050, unjacketed portions 956A of optical fibers 956 may be inserted into cable grooves 1055. A temporary adhesive, e.g., a relatively higher viscosity adhesive, or a mechanical clamp may be applied to unjacketed portions 956A, and in some arrangements to the jacketed portions, of optical fibers 956 extending along cable grooves 1055 to maintain a position of the unjacketed portions relative to cable grooves 1055 of lower cover portion 154. Upper and lower cover portions 1052, 1054 are then mated to each other with unjacketed portions 956A between cable grooves 1053, 1055, in the form shown in FIG. 12A by an adhesive, e.g., epoxy, or by a low temperature solder and allowed to cure. A permanent adhesive is then applied to the jacketed portions of optical fibers 956 in order to reduce the chances of breakage of any of the fibers, should the fibers be bent, relative to arrangements in which the only mechanical connection between the fibers and MT ferrule 1050 is the compression of cable grooves 1053, 1055 against unjacketed portions 956A of the optical fibers. Upper and lower cover portions 1052, 1054 preferably may be made of glass, e.g., silica glass, or silicon providing heat resistance sufficient to maintain the cover portions in a solid state under heat treatment during manufacture of integrated adapter 905. Dual alignment pins 1057A, 1057B are placed within respective lower pin grooves 1058A, 1058B and extend through and are maintained in position by upper pin grooves 1059A, 1059B when upper cover portion 1052 is arranged upon and mated to lower cover portion 1054. When MT ferrule 1050 is fully assembled with dual alignment pins 1057A, 1057B properly arranged between upper and lower cover portions 1052, 1054, the alignment pins extend beyond an end of the upper and lower cover portions. In this manner, alignment pins 1057A, 1057B may be inserted into corresponding alignment holes of a corresponding breakout connector of a breakout cable when MT ferrule 1050 and the breakout cable are inserted into MPO adapter 960 to aid in the proper alignment of ends of optical fibers 956 with ends of corresponding optical fibers of the MPO breakout cable within the breakout connector. Such a breakout cable having such a breakout connector may be in the form of MPO breakout cable 980 with the exception that the breakout connector may include the alignment holes and exclude alignment pins as described previously herein with respect to breakout cable 980. In alternative arrangements, breakout cable 980 may be employed and pins of the breakout cable may extend into the holes defined by the respective interfaces of lower pin grooves 1058A, 1058B and upper pin grooves 1059A, 1059B.

In one example, to assemble the components of a splitter component integrated adapter such as integrated adapter 905 but using MT ferrule 1050, the components of the breakout adapter are axially aligned with each other using fixtures prior to curing adhesives 906, 907, 908 to mate the corresponding breakout adapter components. The aligned components of the breakout adapter are then preferably heated to temperatures that low-temperature solder can flow to cure adhesives 906, 907, 908 simultaneously. Connector cover 990, which may be in the form of a rectangular box as shown, a jacket, an encapsulation, or other known covers suitable to provide a watertight seal for the components within the cover, is then placed around the mated components of the breakout adapter such that inner ends of LC adapter 910 and MPO adapter 960 are received within corresponding ends of the cover. In this manner, connector cover 990 provides a mechanical support holding splitter 930 and adapters 910, 960 generally in alignment. Connector cover 990 may be made of a plastic material sufficient to inhibit the intrusion of dust into integrated adapter 905. The use of glass, ceramic, or other suitable material for MT ferrule 1050 allows the MT ferrule to be heated along with adhesive 906, 907, 908 providing for a faster assembly operation for the breakout adapter. In this manner, at least any combination of single fiber assembly 920, adhesive 906, splitter 930, adhesive 907, multi-fiber ribbon assembly 940, adhesive 908, and the plurality of optical fibers 956 may be heat treated and then cooled simultaneously such that the heated and cooled components are mated together as an assembly.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments set forth above and that other arrangements may be devised without departing from the spirit and scope of the present technology. In this regard, the present technology encompasses numerous additional features in addition to those specific features set forth herein. Moreover, the foregoing disclosure should be taken by way of illustration rather than by way of limitation as the present invention is defined by the claims set forth below.

The invention claimed is:

1. An optical connector assembly comprising:
an optical component assembly including an optical unit;
first inner and first outer optical fibers on opposing sides of the optical unit such that the optical unit receives a first optical signal from the first inner optical fiber and the first outer optical fiber receives a second optical signal from the optical unit or such that the optical unit receives the second optical signal from the first outer optical fiber and the first inner optical fiber receives the first optical signal from the optical unit;
a componentry cover encapsulating an entirety of the optical unit and first portions of the first inner and the first outer optical fibers;
a connector through which a second portion of the first outer optical fiber extends, the second portion being exposed to route the second optical signal; and
a bendable cover attaching the componentry cover to the connector,
wherein the bendable cover has an outer diameter along an entirety of a length of the bendable cover at least as large as an outer diameter of the componentry cover where the bendable cover attaches to the componentry cover.

2. The connector assembly of claim 1, wherein the optical unit is a termination unit and each of the inner and outer optical fibers terminates at the termination unit.

3. The connector assembly of claim 1, wherein the optical unit is at least one selected from the group of a wavelength-division multiplexer (WDM), a tap filter, a reflector, an attenuator, and a dispersion compensator.

4. The connector assembly of claim 1, wherein the connector further includes a ferrule and the second portion of the first outer optical fiber extends through the ferrule.

5. The connector assembly of claim 4, wherein the connector further includes a connector housing surrounding a portion of the ferrule.

6. The connector assembly of claim 1, further comprising:
a jacket surrounding a second portion of the first inner optical fiber; and
a chamfer or round having opposing ends attached to the componentry cover and the jacket, respectively.

7. The connector assembly of claim 6, wherein an outside diameter of the componentry cover is larger than an outside diameter of the jacket such that the respective chamfer or round tapers from the componentry cover to the jacket.

8. The connector assembly of claim 6, further comprising a boot overlying the jacket and adjacent to the componentry cover to expose the componentry cover, wherein the respective chamfer or round is defined by the boot.

9. The connector assembly of claim 1, wherein the bendable cover is bendable from a first state to a second state, and wherein the second state is maintained in the absence of an external force being applied to the optical connector assembly.

10. The connector assembly of claim 9, wherein the bendable cover is bendable to at most an angle corresponding to a minimum bending radius for the optical fibers.

11. The connector assembly of claim 9, wherein the bendable cover and the componentry cover are integral with each other such that the covers are inseparable without fracture of either one or both of the covers.

12. The connector assembly of claim 9, wherein the bendable cover is in the form of bellows.

13. The connector assembly of claim 1, wherein the componentry cover defines a notch extending to an end of the cover through which the first inner optical fiber extends.

14. The connector assembly of claim 1, wherein the outer diameter of the bendable cover is at least as large as an outer diameter of the componentry cover along an entirety of a length of the componentry cover.

15. The connector assembly of claim 14, wherein the optical unit includes an electro-optical component configured for attachment to an electrical wire to thereby convey an electrical signal from the electrical wire.

16. An optical cable termination assembly, comprising:
the connector assembly of claim 1; and
a termination unit, the connector assembly being inserted into the termination unit to either one or both of i) route the second optical signal from the first outer optical fiber to another optical connector assembly inserted in the termination unit and ii) receive the second optical signal at the first outer optical fiber from the other optical connector assembly inserted in the termination unit.

17. An optical connector assembly combination, comprising:
the connector assembly of claim 13, such connector assembly being a first connector assembly; and
an additional connector assembly in the form of the first connector assembly, wherein the additional connector assembly is bendable such that a portion of a componentry cover of the additional connector assembly is able to contact the notch of the first connector assembly when the additional connector assembly and the first connector assembly are in respective bent states.

18. An optical connector assembly combination, comprising:
the connector assembly of claim 13, such connector assembly being a first connector assembly; and
an additional connector assembly in the form of the first connector assembly, wherein the additional connector assembly is bendable such that a portion of a componentry cover of the additional connector assembly fits within the notch of the first connector assembly when the additional connector assembly and the first connector assembly are in respective bent states.

19. An optical connector assembly comprising:
an optical component assembly including an optical unit;
first inner and first outer optical fibers on opposing sides of the optical unit such that the optical unit receives a first optical signal from the first inner optical fiber and the first outer optical fiber receives a second optical signal from the optical unit or such that the optical unit receives the second optical signal from the first outer optical fiber and the first inner optical fiber receives the first optical signal from the optical unit;
a componentry cover encapsulating an entirety of the optical unit and first portions of the first inner and the first outer optical fibers;
a connector through which a second portion of the first outer optical fiber extends, the second portion being exposed to route the second optical signal; and
a bendable cover attaching the componentry cover to the connector,
wherein the bendable cover is bendable from a first state to a second state and the second state is maintained in the absence of an external force being applied to the optical connector assembly,
wherein less force is required to bend the bendable cover than to bend the componentry cover, and wherein the second portion of the first outer optical fiber further extends through the bendable cover.

20. The connector assembly of claim 19, wherein the bendable cover is configured to be straight in either the first state or the second state.

\* \* \* \* \*